(12) United States Patent
Hoang et al.

(10) Patent No.: US 11,176,115 B2
(45) Date of Patent: Nov. 16, 2021

(54) DEPENDENCY LOCKING

(71) Applicant: Oracle International Corporation, Redwood Shores, CA (US)

(72) Inventors: Chi Kim Hoang, Palo Alto, CA (US); Chih-Ping Wang, Palo Alto, CA (US); Nagender Bandi, Foster City, CA (US); John Miller, Los Altos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 135 days.

(21) Appl. No.: 16/428,892

(22) Filed: May 31, 2019

(65) Prior Publication Data

US 2020/0125549 A1 Apr. 23, 2020

Related U.S. Application Data

(60) Provisional application No. 62/748,337, filed on Oct. 19, 2018.

(51) Int. Cl.
*G06F 16/00* (2019.01)
*G06F 16/23* (2019.01)
(Continued)

(52) U.S. Cl.
CPC ........ *G06F 16/2343* (2019.01); *G06F 16/219* (2019.01); *G06F 16/2358* (2019.01); *G06F 16/27* (2019.01)

(58) Field of Classification Search
CPC .... G06F 16/2343; G06F 16/27; G06F 16/219; G06F 16/2358
See application file for complete search history.

(56) References Cited

U.S. PATENT DOCUMENTS

| 8,346,719 | B2* | 1/2013 | Sudhakar | G06F 16/10 707/610 |
| 9,578,130 | B1* | 2/2017 | Nguyen | H04L 67/32 |
| 2011/0295822 | A1* | 12/2011 | Chandrasekaran | G06F 12/0815 707/704 |

* cited by examiner

*Primary Examiner* — Hung Q Pham
(74) *Attorney, Agent, or Firm* — Hickman Becker Bingham Ledesma LLP

(57) ABSTRACT

Techniques are described for performing dependency locking to enable parallel execution of database server processes modifying the same object. In an embodiment, a DBMS receives a request to execute an operation on its managed database. The request may include an object identifier and a version identifier for a version of a database object, which is required for the successful execution of the operation on the database. The required version of the database object may not exist and may be generated only after the execution of another, second, operation on the database. The first database server process initiates execution of the earlier received operation on the database. The first database server process queries the first database for the version of the particular database object and determines that the version of the database object does not exist yet, in one embodiment. Based on such a determination, a dependency lock is generated for the version of the object, and the first database server process is suspended, preventing the completion of execution of the earlier received operation on the database. Another, second database server process executes another operation on the database and causes the generation of the version of the object on the database. The dependency lock is thereby released for the version of the object, and the first database server process completes the execution of the first operation on the first database.

20 Claims, 6 Drawing Sheets

(51) Int. Cl.
*G06F 16/27* (2019.01)
*G06F 16/21* (2019.01)

DEPENDENCY LOCKING

BENEFIT CLAIM

This application claims the benefit under 35 U.S.C. § 119(e) of provisional application 62/748,337, filed Oct. 19, 2018, the entire contents of which is hereby incorporated by reference for all purposes as if fully set forth herein.

FIELD OF THE TECHNOLOGY

The present invention relates to the field of electronic database management, in particular to managing dependencies in a multi-tenant computer database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database management systems (DBMS) provide higher availability by duplicating data within the peer DBMSs of higher availability database management system (HA-DBMS). However, to ensure that one DBMS (standby DBMS) can take over the failed (primary) DBMS of the HA-DBMS, the duplicate data cannot diverge. A client application that modifies data in one DBMS has to cause the same modification to be applied to the replica database in the standby/peer DBMS. The replication of such a modification in the standby/peer DBMS may be performed either synchronously or asynchronously with the primary DBMS depending on the type of HA-DBMS. A critical problem may arise in an HA-DBMS if a database operation operates on an incorrect version of the data in the replica database.

In an HA-DBMS that uses parallel stream-based replication methodology to replicate, the replica databases are maintained asynchronously. Client applications modify data on only one replica of the DBMS (e.g., the primary database of the primary DBMS). The originating transactions are transmitted to the secondary DBMS and applied to other replica databases (e.g., standby database(s) of the standby DBMS(s)).

To accelerate the replication, transactions are streamed and applied in parallel. However, with such parallel streaming, the same data (e.g., a row in a table) may be modified by different streams on the standby database. Thus, if the parallel streams are not coordinated in an orderly fashion, data dependencies are lost, and the standby database may be corrupted.

The problem is not confined only to asynchronous HA-DBMSs. In synchronous HA-DBMSs, parallel stream-based replication is performed during the recovery of the failed DBMS to replicate data that was modified while the DBMS was offline.

Furthermore, in a synchronously replicated HA-DBMS, concurrent workload performance during database recovery also encounters the same issue. In a synchronously replicated HA-DBMS, all database changes are applied directly to the replicas in a synchronous fashion using two-phase (prepare-commit) protocol. However, when one of the DBMS's fails and becomes unavailable, the concurrent workload transactions continue to commit, albeit, only on the functioning DBMS('s). When the failed DBMS tries to recover from its functioning DBMS, a performance disruption is caused to the concurrent workload targeting the database of the failed DBMS. While the failed DBMS was unavailable, the functioning DBMS may have committed one or more transactions. Thus, the failed DBMS needs to "catch up" on the data changes that had happened to the functioning DBMS when the failed DBMS was down. For example, a new concurrent workload received from a client by the HA-DBMS may include updating a row that does not exist in the failed DBMS because the row was inserted while the failed DBMS was down. Thus, only after fully "catching up" may the failed DBMS accept concurrent workloads.

However, at the same time, while the failed DBMS is "catching up" with the changes that the failed DBMS missed during its unavailability, the HA-DBMS receives new transactions from client applications and applies them to the functioning DBMS's.

Although the failed DBMS is online and is theoretically ready to accept workloads, these new workloads may depend on the changes during the unavailability that the failed DBMS is still applying. The failed DBMS has to verify that the data or objects modified by the concurrent workload already exist and are of the correct version. If a concurrent workload modifies data without having the data dependencies enforced, the standby/peer database will have data corruption.

If the failed DBMS must wait for all the changes to be applied in the same order to avoid data corruption and only then start accepting concurrent workloads, the failed DBMS may have to wait forever or more precisely until there is a slowdown in client requests received by the HA-DBMS.

One approach for the failed DBMS to start accepting new workloads even if the recovery of changes from the functioning DBMS has not been completed is to enforce the correct order between the workloads-caused changes and recovery caused changes. To do so, the failed DBMS has to compute the dependency in advance of the execution of the changes and order the execution to satisfy the dependency through the re-arranged order. However, computing dependency is a complex problem by itself that may take extensive computational resources.

Another simpler approach is to represent object dependency by hash-based values, but that may result in false positives and yield unnecessary waits that hinder replication performance.

BRIEF DESCRIPTION OF THE DRAWINGS

In the drawings of certain embodiments in which like reference numerals refer to corresponding parts throughout the figures.

DETAILED DESCRIPTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe transactional dependency locking ("dependency locking") for faster DBMS data replication and recovery. With these approaches, recovering of a DBMS is not blocked from replicating concurrent workloads on the peer or other sources of the workload. Dependency locking is also used to make parallel stream replication between databases more efficient by reducing latency in asynchronous replication scenario. Furthermore, the approaches herein enable parallel stream replication to be combined with concurrent workload execution for a recovering DBMS in synchronous replication scenario.

In an embodiment, a DBMS received database operation, which is to be executed on a database object that does not exist yet or the appropriate version of which has not been created yet in a database, is not rejected by the DBMS. Rather, the database server process tasked with executing the database operation is suspended using dependency lock. The dependency lock is released only when the database object and/or its appropriate version has been generated by another database server process. Accordingly, one database server process may generate a dependency lock while another database server process may release the dependency lock.

Figure 6:
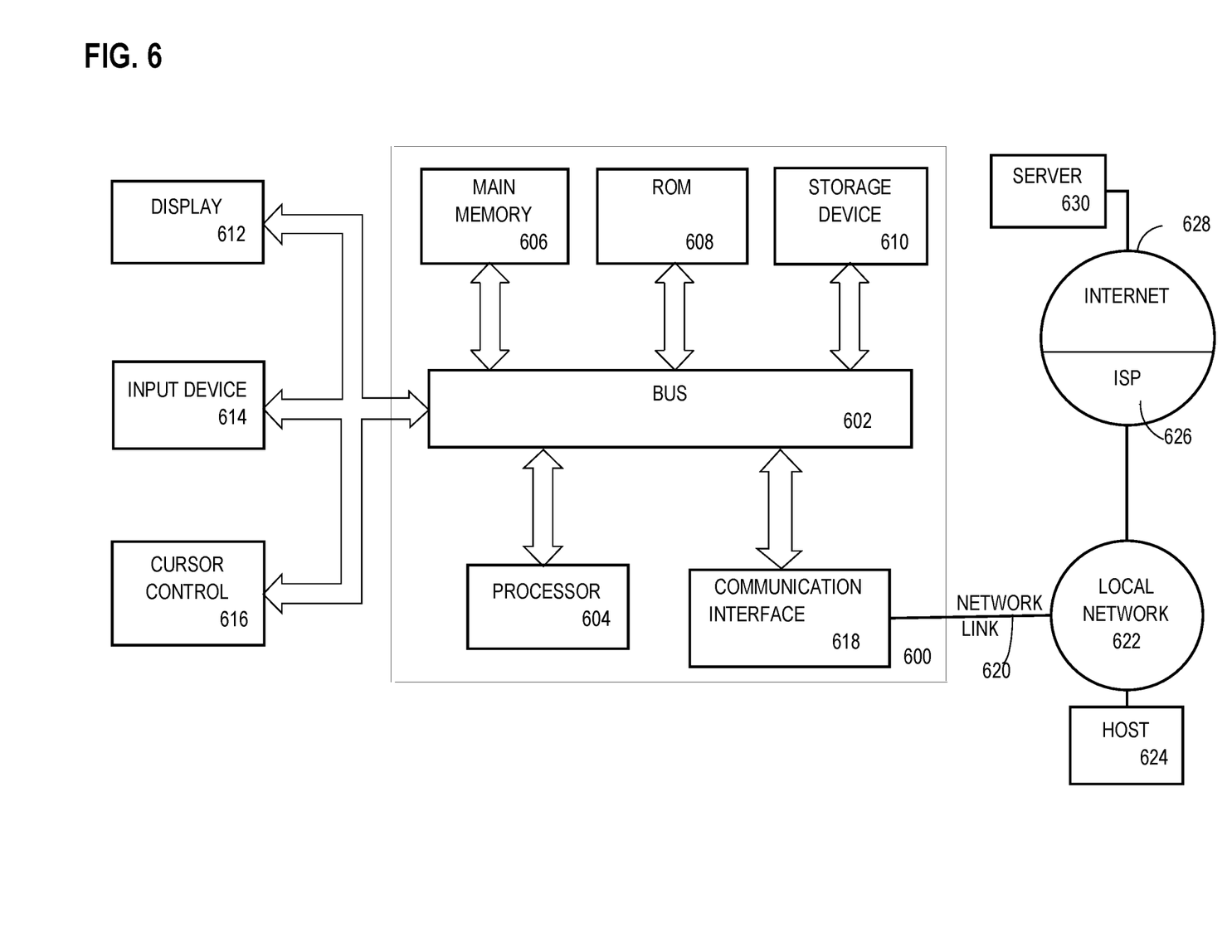
FIG. 6 is a block diagram that illustrates a computer system upon which an embodiment of the invention may be implemented.

In an embodiment, stream replication, which may be used for synchronization or recovery of HA-DBMS, utilizes a series of change records that have been maintained for the primary database. The term "redo/undo record" (or simply "record" or "redo record") refers to information necessary for a change to a database object to be redone/undone on a database. Such a redo record, as an example, may describe a change to a row in a database table by a transaction. According to an embodiment, a cache in volatile memory (e.g., in main memory 606) may store redo records (e.g., a log buffer) before eventually the described change in the records is committed to persistent storage (e.g., in storage device 610).

In an embodiment, a redo record contains a unique object identifier to identify the database object(s) and/or version(s) for the database object(s) involved in the transaction, for which the redo record is generated. For example, for a row insert operation, a redo record may have information regarding the database table, the row number and version number that will be associated with the row once the insert operation/transaction is committed. For a row delete operation, a redo record may have information regarding the database table, the row number, and version of the row which was deleted. For a row update operation, a redo record may have additional information such as the previous row version number, as an example. In an embodiment, if the same database object is instantiated but then deleted and re-instantiated, a different object identifier is generated for the database object. Stated differently, each incarnation of the same database object can be assigned a different unique object identifier.

In an embodiment, a standby DBMS of HA-DBMS is updated by a parallel stream replication of redo records from the primary DBMS. The parallel stream replication may occur asynchronously from the transactions received and committed and/or the redo log application by the primary DBMS. Accordingly, the stream of redo records may not be applied by the standby DBMS in the same order as generated by the primary DBMS. In such an embodiment, regardless of the technique used for asynchronous replication of changes, a dependency lock data structure is used to ensure that the application of the changes on the standby DBMS occurs in the same order as in the primary DBMS.

In a synchronous replication embodiment, a concurrent workload executing on the DBMS, such as a transaction to modify data of the database, is transmitted to the recovering DBMS for execution. While in the recovery, the failed DBMS may not have had applied all changes that were missed by the failed DBMS during the downtime. In an embodiment, to catch up with the changes in the peer DBMS, the recovering DBMS is applying a stream of changes from the peer DBMS, such as a stream of redo records, in order to bring the database to the state at which concurrent workloads may be executed. In such an embodiment, regardless of the technique used for synchronous replication of changes, a dependency lock data structure is used to ensure that the application of the changes on the recovering DBMS occurs in the same order as in the peer DBMS.

In an embodiment, a dependency lock data structure tracks dependency locks associated with database objects and/or the version(s) thereof. An object identifier and version information for a database object may be maintained in association with the database object. For example, for a row of a database table, a primary key or a row number may serve as the object identifier, and a separate field (e.g., a column of the table) may store the current version number for the row. For other database objects, the object metadata may be used to store the object identifier and/or the version. The database object for which a redo record is generated stores the object identifier and the version for the object identifier as discussed above. Accordingly, any change that is committed to a database object (in redo records and/or persisted in database blocks) has an associated object identifier and version information.

In an embodiment, when a DBMS receives a command to commit an update or delete or any other change for which the database object with the specified object identifier and version information does not exist, the DBMS generates a dependency lock for the database object by storing information about the database object in the dependency lock structure. The database server process of the DBMS performing the commit requiring a non-existent database object or a version thereof is suspended until another database server process signals the generation of such an object. The "pre-requisite object" refers to an object or a version thereof that may not exist yet but a modification operation for which is requested to execute.

Accordingly, a dependency lock structure is a repository storing one or more references to the pre-requisite objects. The dependency lock structure may be a hash table stored in the memory accessible by different database server processes of the DBMS. The key of the hash table may be generated based on applying a hash function on a combination of an object identifier and version number of the pre-requisite object(s), such that each of the hash buckets, if any, contains such information.

In an embodiment, each pre-requisite object in the dependency lock structure is associated with the corresponding suspended database server process that is waiting for the generation of the pre-requisite object. For example, a hash bucket referencing the pre-requisite object may also contain the database server process identifier (or thread identifier) that is suspended due to the non-existence of the pre-requisite object. Another database server process that eventually generates the pre-requisite object signals to the dependency lock structure to release the lock for the pre-requisite object and thereby causes the re-activation of the corresponding suspended database server process to apply the change to generate the pre-requisite object.

In an embodiment, when a database server process generates a database object or a version thereof, the database server process itself queries the dependency lock data structure(s) to determine whether any corresponding pre-requisite object exists. Based on the positive response, the database server process for the corresponding pre-requisite object is activated to continue the committal of the changes to the now-existing database object. Alternatively, when a database server process generates a database object or a version thereof, such a process may broadcast a message to the database server process(es) that maintain dependency lock data structure(s) (such as query coordinator (QC) process(es)) indicating that the pre-requisite object has been committed to the database. Based on the received message, the corresponding suspended database server process may be activated to commit the change operation on the pre-requisite object.

System Overview

Figure 1:
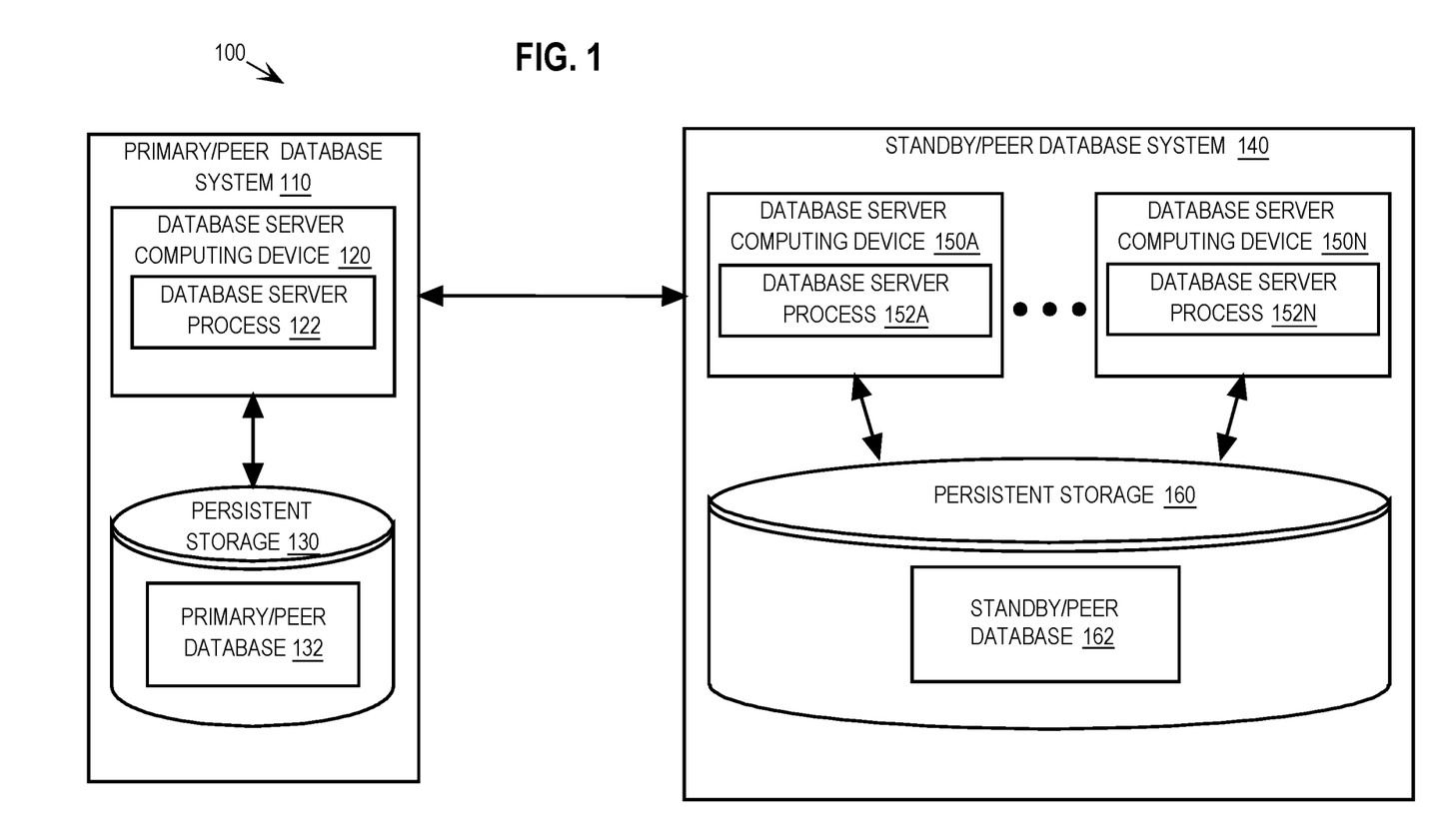
FIG. 1 is a block diagram that depicts a highly available database management system (HA-DBMS), in one or more embodiments.

FIG. 1 is a block diagram that depicts an HA-DBMS 100, in one or more embodiments. In case of data corruption or system failure at a database, one or more physical or logical copies of the database may be maintained as separate databases known as standby/peer databases. Thus, if the database fails, a standby/peer database takes over servicing client application requests. Typically, the peer databases are maintained in separate database systems that are remotely connected. For example, FIG. 1 depicts multiple database systems that are communicatively coupled. Referring to FIG. 1, primary/peer database system 110 maintains primary/peer database 132, and standby/peer database system 140 maintains standby/peer database 162.

A primary/peer database system and a standby/peer database system may each correspond to any of a number of different types of database systems, such as a clustered database system (as depicted for standby/peer database system 140), a single-server database system (as depicted for primary/peer database system 110) and/or a multi-tenant database system (not depicted in FIG. 1). In the example of FIG. 1, the primary/peer database system 110 includes a database server computing device 120 and persistent storage 130. Database server computing device 120 runs a database server process 122, which is a collection of memory and processes that interact with primary/peer database 132. Database server process 122 implements the server-side functions of primary/peer database system 110.

Standby/peer database system 140 includes database server computing devices 150A-N and persistent storage 160 (which may or may not be distributed among persistent storage of database server computing devices 150A-N). The label "N" in "150N," and in any other reference numeral herein, connotes that any number of elements, items, or sets of items may be present or used in embodiments, as in "1 to n items". Database server computing devices 150A-N correspond to clustered nodes that each run one of database server processes 152A-N. Standby/peer database server computing devices 150A-N may communicate with each other via an interconnect (not shown).

Each database server process of 152A-N is a collection of memory and processes that interact with standby/peer database 162. Database server processes 152A-N collectively implement server-side functions of standby/peer database system 140. Although each of processes 152A-N are depicted on a different server computing device, in one embodiment, multiple database server processes may be running on a single database server computing device. Additionally or alternatively, techniques described herein may be implemented by such multiple processes running on a single database server computing device. Accordingly, each process of database server processes 152A-N may be a parallel process or thread running in a memory space of a database server computing device.

In addition to residing on persistent storage 130 and persistent storage 160, as depicted in FIG. 1, primary/peer database 132 and standby/peer database 162 may each reside in whole or part in volatile storage, such as volatile memory running on device 120 and/or on any of devices 150A-N. Furthermore, primary/peer database 132 and standby/peer database 162 may each be stored on a virtual disk and/or a set of physical disks.

Functional Overview

In an embodiment, in which parallel stream-based replication is used, HA-DBMS 100 may be configured with asynchronous replication. Database changes made by primary DBMS 110 on primary database 132 are asynchronously propagated/applied by standby DBMS 140 on standby database 162. Parallel streaming is imperative for achieving high-performance replication in such an embodiment. To impose dependency tracking while applying parallel streams of dependent data, database server processes 152 . . . 152N when applying any stream that modifies standby database 162, check if the database object to be modified is of the correct version before modifying.

In an embodiment, the replication stream contains pre-requisite object information for database object(s) that the stream modifies. The "pre-requisite object information" term refers to the information that uniquely describes a pre-requisite object such as a database object identifier and version information before and after the update. For example, each redo record that describes a change to a database object may contain pre-requisite object information such as the primary key for the row being modified and the respective version numbers of the row before and after the modification.

Based on the pre-requisite information in the received replication stream, standby DBMS 140 may determine whether the database object or version thereof affected by the modification already exists in the database or has not yet been generated. If using the replication stream information, any of the standby database server processes attempts to modify a non-existent database object in standby database 162 (due to the operation being executed out of order from those in the primary DBMS 110), a dependency lock is generated in a dependency lock data structure. The database server process for which the dependency lock is generated has to wait until the lock is released by another database server process of standby DBMS 140 before modifying the database object, in an embodiment. Such a release may occur when standby DBMS 140 modifies the database object to the required version or generates the pre-requisite database object by applying other redo records of the replication stream.

Alternatively, HA-DBMS 100 may be configured with a synchronous replication rather than asynchronous stream replication as described above. In the synchronous replication, client applications modify data on both database 132 and database 162, as peer databases, in a synchronous fashion. Thus, the modifications are applied in the same order on peer database 132 and peer database 162 obliviating any need for dependency locking. However, if, due to a critical failure, one peer DBMS, DBMS 110 goes down and then comes back online, during the offline time, peer database 162 is updated with new changes, while the other peer, database 132, is not.

When recovering DBMS 110 comes online, database 132 has to be updated with the missed changes. The DBMS 110 may use stream-based replication to apply the missed changes from up-to-date DBMS 140. For example, DBMS 110 may use redo-record based catchup techniques (such as Log Based Catch Up (LBCU)) by streaming redo records from DBMS 140 to DBMS 110 and applying the records to modify database 132 with the missed changes.

In an embodiment, while performing such a recovery, peer DBMS 110, which is still configured for synchronous replication, receives new concurrent workloads received by other peer DBMS 140. This will result in scenarios, in which the concurrent workloads on DBMS 110 may attempt to modify database object(s) that have not yet been replicated onto its database 132 due to ongoing recovery.

In such an embodiment, for concurrent workloads to be performed on recovering database 132, dependency locks are used. When a concurrent workload is received on peer DBMS 140 for preparing the transaction to be committed on peer database 162, the peer DBMS obtains the pre-requisite object information for the transaction and transmits it to recovering DBMS 110 in association with the concurrent workload.

Any database server process of recovering DBMS 110 that attempts to modify the database object(s) on recovering database 132 based on the received transaction retrieves the pre-requisite object information to determine whether the appropriate database object or the version thereof for the transaction exists. If such database object does not exist due to part-recovery of database 132, the database server process of DBMS 110 generates corresponding dependency lock(s) to wait on the recovery database server process to generate the database object(s) or the appropriate version thereof. This wait may end at the moment a database server process of recovering DBMS 110 receives and applies the recovery stream from peer DBMS 140 that generates the pre-requisite object on recovering database 132.

For example, a concurrent user transaction that is synchronously processed by DBMS 140 and newly online DBMS 110 attempts to delete a row. However, this row itself was inserted into the table when DBMS 110 was down, and thus it does not yet exist on database 132. The concurrent transaction may commit on peer DBMS 140 because peer database 162 is up-to-date with the previous insert operation of the row. However, on recovering DBMS 110, the concurrent transaction may generate a dependency lock if the redo-record for the row has not yet been received and applied for the insert operation on DBMS 110. The concurrent delete transaction on DBMS 110 waits on the generated dependency lock until the lock is released by the database server process that applies the redo record for the row insert operation.

Similar techniques may be used when parallel stream-based replication is used by HA-DBMS 100, and DBMS 110 is recovering, or when HA-DBMS is configured for asynchronous replication and replications occur out of order.

As compared with the in-order execution techniques in which transaction during recovery or otherwise are always re-ordered and serially applied, the techniques herein significantly improve the performance by allowing for the parallelism of execution. If no database object dependency is encountered, an asynchronously replicated HA-DBMS (or a synchronously replicated HA-DBMS in recovery) executes transactions in parallel significantly outperforming serial in-order executions. Stated differently, because in many cases there may not be any database object dependencies, the dependency locks may not be generated. Thus, the database server processes for the recovery and/or asynchronous replication are performed in parallel and thus, significantly speedup HA-DBMS 100's performance.

Delete Operation with Dependency Locking

Figure 2:
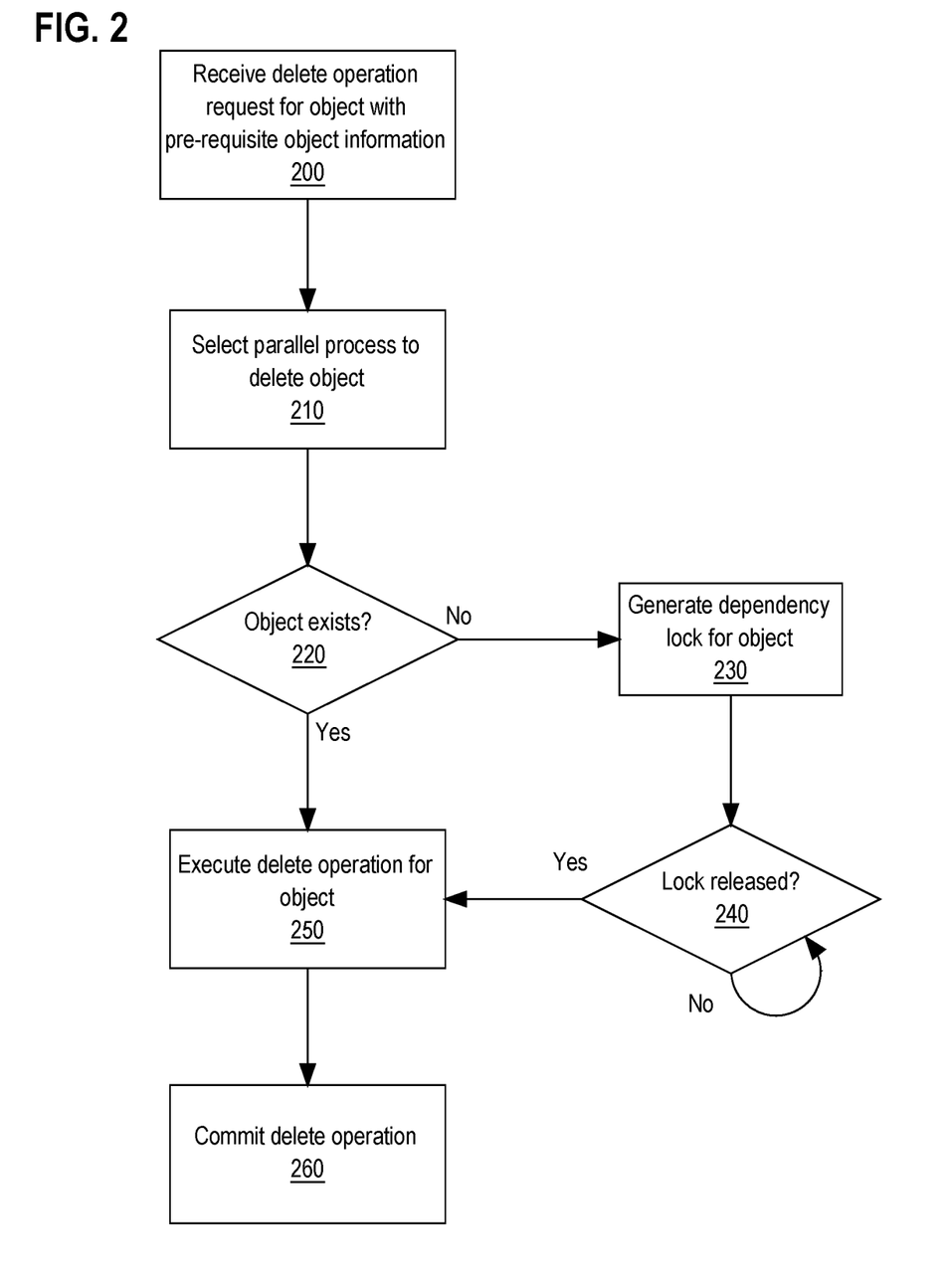
FIG. 2 is a flow diagram that depicts the process for a delete operation of a database object, in an embodiment.

FIG. 2 is a flow diagram that depicts the process for a delete operation of a database object, in an embodiment. At block 200, a DBMS receives a delete operation request for a database object that includes the pre-requisite object information for the database object. For example, the pre-requisite object information may indicate the database object version before the delete operation is committed.

Continuing with FIG. 2, at block 210, the receiving DBMS may spawn or assign a database server process for performing the delete operation in parallel with other operations being performed by other parallel database server processes. For example, a query coordinator process may spawn a new slave process to execute the delete operation request in parallel with other slave processes performing other operations.

At block 220, the database server process determines whether the pre-requisite database object with the specified object identifier and the version number in the received pre-requisite object information exists. If at block 220, the specified pre-requisite object or the specified version thereof do not exist, the database server process generates a dependency lock at block 230.

In an embodiment, the dependency lock is created by storing the pre-requisite object information into a dependency lock data structure. The dependency lock data structure may include the identifying information of the database server process executing the delete operation. Additionally, the dependency lock data structure may include a lock status indicating whether the lock is active or released; and/or the existence of the entry in the dependency lock data structure for the version of the database object indicates that the lock is active and has not been released.

In an embodiment, upon storing the pre-requisite information in the dependency lock data structure, the database server process executing the delete operation is placed in the wait state at block 240 until the pre-requisite object is generated in the receiving database releasing the lock. The database server process may be suspended or killed to be re-activated/re-spawned upon the release of the lock.

After the dependency lock is generated, at block 240, the database server process waits on the dependency lock to be released. In an embodiment, a database server process that creates the pre-requisite object in the database notifies the database server processes about the existence of the pre-requisite object causing the waiting database server process to exit the wait state and commit the delete operation. In an alternative embodiment, the database server process that generates the pre-requisite object in the database updates the dependency lock structure to remove the lock. The waiting or another database server process periodically checks on the dependency lock to determine whether the dependency lock data structure indicates a release of the database lock. If so, the database server process either continues itself to perform the delete operation or activates the database server process in the wait state to do so.

If the dependency lock is released due to the creation of the pre-requisite object by a database server process at block 240, or if the pre-requisite object is determined to exist at block 220, then the DBMS executes the delete operation for the object at block 250 and commits the delete operation at block 260.

For example, a replica DBMS may receive a request for a delete operation of a row in a table with the pre-requisite object information that includes the primary key and the version number of the row. The query coordinator process executing the transaction that includes the delete operation on the replica DBMS, spawns a slave process to perform the delete operation. The slave process queries the table for the primary key indicated in the pre-requisite object information and checks whether the version field of the row contains the specified version number. If the table does not exist, or the row with the primary key does not exist, or if the row with the primary key has a different version number, the pre-requisite object for the delete operation, has not yet been generated. The query coordinator process (or the slave process itself) generates a dependency lock associated with this row by inserting the row information into a dependency lock data structure, such as a hash table instantiated in the memory space of the query coordinator process. The key for the hash table may be the hash of a combination of one or more: the table identifier, primary key and the version number, and the corresponding hash bucket(s) may contain the same info. Each hash bucket is further associated with the process identifier of the slave process, which was performing the delete operation. The slave process of the delete operation is suspended until the lock is released. Once the dependency lock is signaled for release by the query coordinator receiving a message that the specified pre-requisite object has been generated, the slave process is re-activated, and the delete operation is committed.

Update Operation with Dependency Locking

Figure 3:
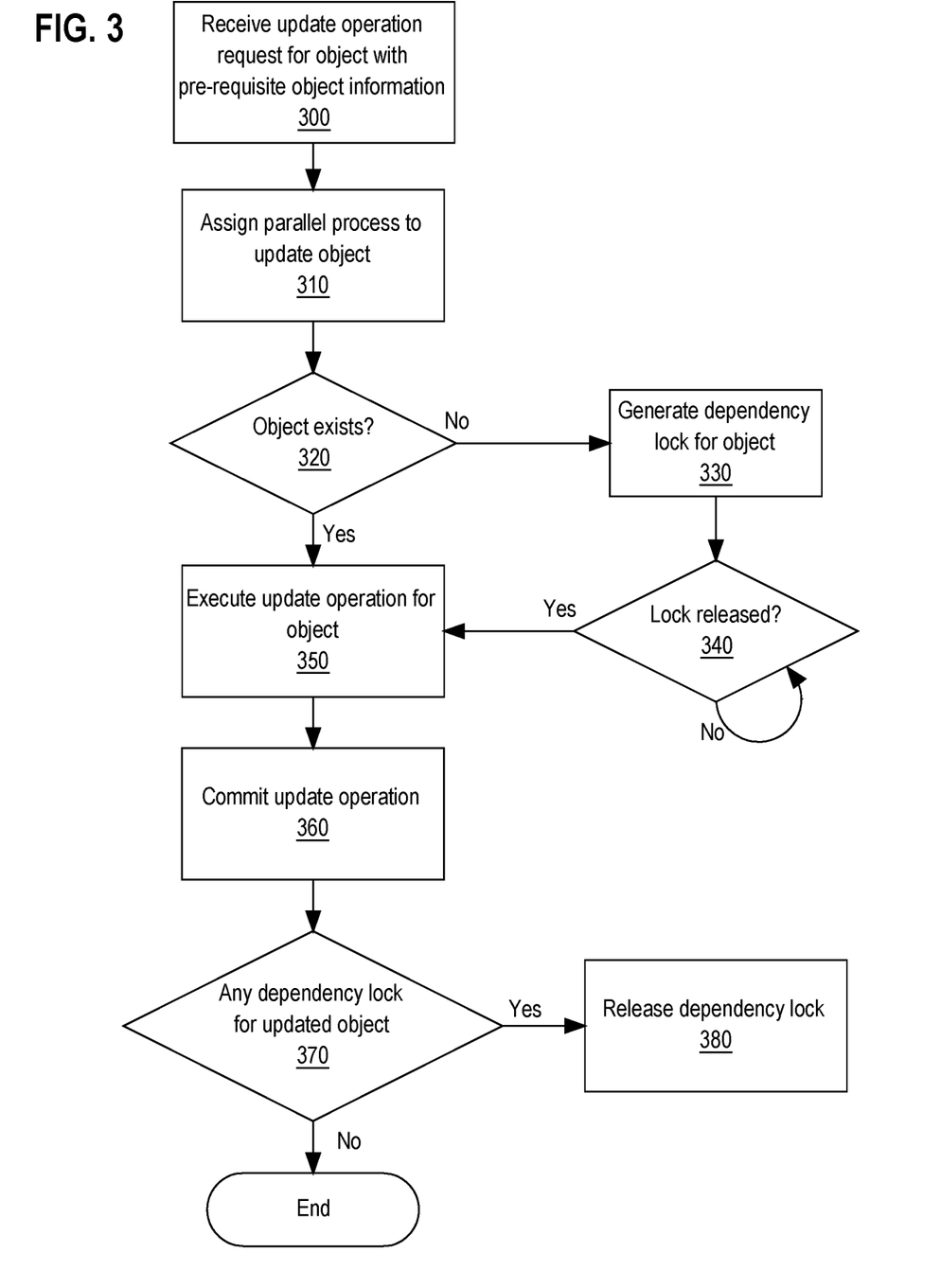
FIG. 3 is a flow diagram that depicts the process for an update operation of a database object, in an embodiment.

FIG. 3 is a flow diagram that depicts the process for an update operation of a database object, in an embodiment. At block 300, a DBMS with parallel modification database server processes receives an update operation request for the database object that is further described by the pre-requisite object information. For example, the pre-requisite information may include the version number of the pre-requisite object before the update operation, as well as the new version number of the pre-requisite object after the update operation is committed.

Continuing with FIG. 3, at block 310, the receiving DBMS may spawn or assign a database server process for performing the update operation in parallel with other operations being performed by other parallel database server processes. For example, a query coordinator process may spawn a new slave process to execute the update operation request in parallel with other slave processes performing other operations.

At block 320, the database server process determines whether the pre-requisite database object with the specified object identifier and the version number in the received pre-requisite object information exists. If at block 320, the specified pre-requisite object with the original version number does not exist, the database server process generates a dependency lock for the pre-requisite object using the pre-requisite object information at block 330. The dependency lock is generated using techniques described herein and stored in the dependency lock data structure in association with the database server process executing the update operation.

After the dependency lock is generated, at block 330, the database server process waits on the dependency lock to be released. In an embodiment, a database server process that creates the pre-requisite object in the database notifies the database server processes about the existence of the pre-requisite object in the database causing the waiting database server process to exit the wait state and commit the update operation. In an alternative embodiment, the database server process that generates the pre-requisite object in the database updates the dependency lock structure to remove the lock. The waiting or another database server process periodically checks on the dependency lock to determine whether the dependency lock data structure indicates a release of the database lock. If so, the database server process either continues itself to perform the update operation or activates the database server process in the wait state to do so.

If the dependency lock is released due to the creation of the pre-requisite object by a database server process at block 340, or if the pre-requisite object is determined to exist at block 320, then the DBMS executes the update operation for the object at block 350 and commits the updated operation at block 360.

At block 370, the database server process determines whether any dependency lock exists for the new version of the created pre-requisite object. In an embodiment, the database server process signals to other database server processes that a new version of the pre-requisite object has been created, at block 370. Upon a receipt of such a message from the database server process performing the update, the database server process(es) query their respective dependency locking data structure(s) to determine if dependency lock(s) exists for the new version of the pre-requisite object to release one or more dependency locks at block 380. If any entry is identified in the dependency lock data structure(s), at block 380, the corresponding dependency lock(s) are released for the respective database server process(es) that are waiting for the new version of the pre-requisite object. The respective database server process(es) associated with the identified entry(ies) are re-activated to continue with the committal of the operation requiring the new version of the pre-requisite object.

In another embodiment, the update database server process itself queries one or more dependency lock data structures to determine whether any dependency lock data structures contains the database object identifier with the new version number. At block 370, if any dependency locks are identified, the database server process causes the release of the dependency lock(s) at block 380. The release may be performed by updating the status in the dependency lock data structure or erasing the dependency lock data structure, thus signaling the waiting database server process to proceed with the operation(s) requiring the pre-requisite object.

If no dependency lock has been identified at block 370, the update operation is successfully completed.

As an example, a replica DBMS may receive a request for an update operation of a row in a table with the pre-requisite object information that includes the primary key and the version numbers of the row before the update, the previous version number, and after the update, the new version number. The query coordinator process executing the transaction that includes the update operation on the replica DBMS, spawns a slave process to perform the update operation. The slave process queries the table for the primary key indicated in the pre-requisite object information and checks whether the version field of the row contains the specified previous version number. If the table does not exist, or the row with the primary key does not exist, or if the row with the primary key has a different version number, the pre-requisite object for the update operation, has not yet been generated. The query coordinator process (or the slave process itself) generates a dependency lock associated with this row by inserting the row information into a dependency lock data structure, such as a hash table. The slave process of the update operation is suspended until the lock is released. Once the dependency lock is signaled for release by the query coordinator receiving a message that the specified pre-requisite object has been generated, the slave process is re-activated, and the update operation is committed.

After the update is committed, regardless whether the committal occurred because the pre-requisite object existed or was later generated, query coordinator process or the committing process itself broadcasts messages to other processes to signal release(s) of any dependency locks for the updated pre-requisite object. Each query coordinator process that receives the message queries its respective hash table containing dependency locks. If any pre-requisite objects are identified that match the updated pre-requisite object, the corresponding suspended processed(s) are reactivated to finalize the commit of the suspended operation.

For example, the primary DBMS receives another transaction after the updated transaction discussed above. The new transaction includes a delete operation for the same row as in the update operation, as an example. However, the new transaction is executed on the replica DBMS ahead of the update operation transaction, causing a dependency lock for a slave process executing the delete operation. After the committal of the update operation, the query coordinator for the new transaction receives a message that a new version of the row is committed. The query coordinator hashes the row information and identifies the corresponding entry in its hash table associated with the suspended process. The suspended slave process is re-activated, and the delete operation is committed.

Insert Operation with Dependency Locking

Figure 4:
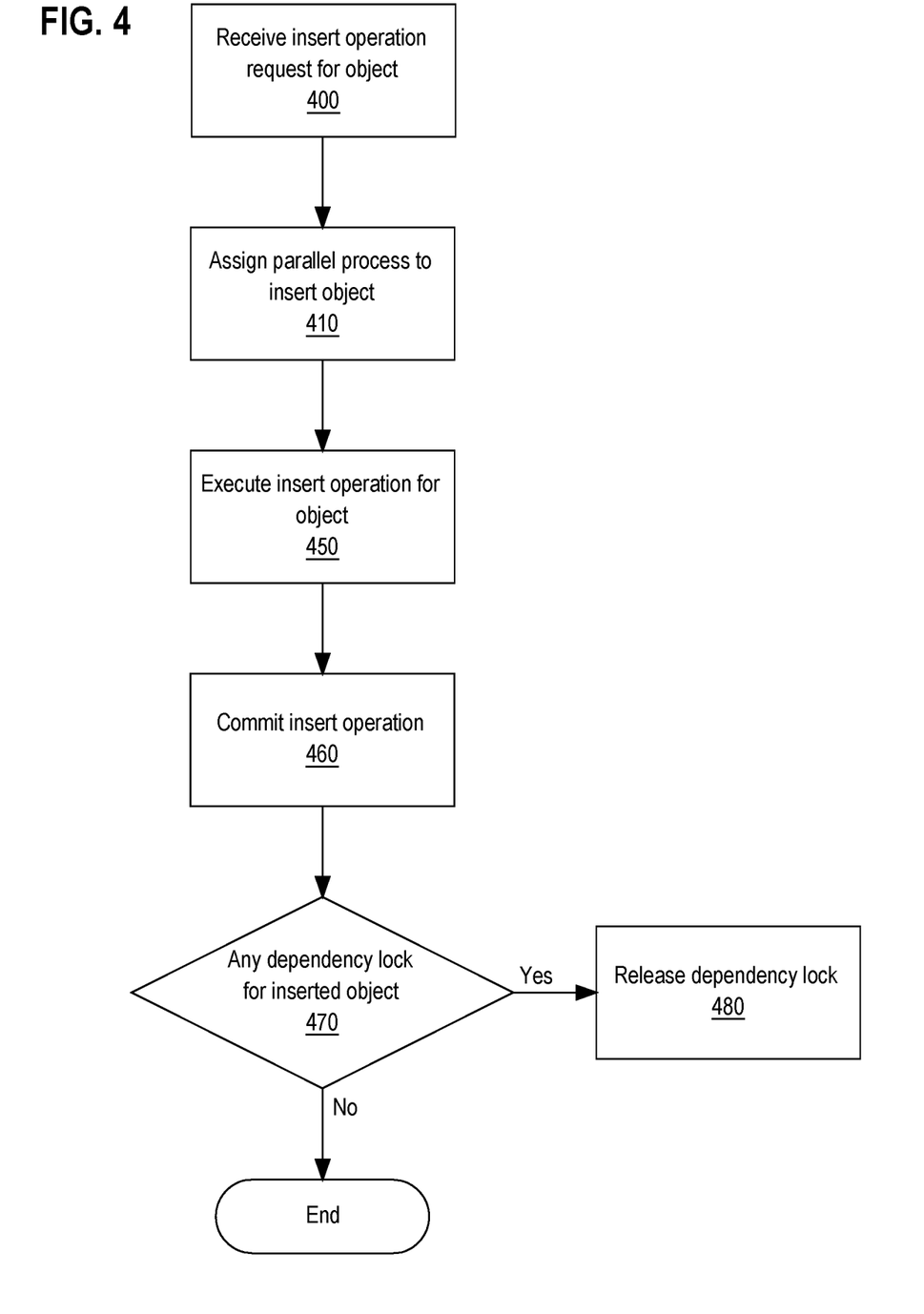
FIG. 4 is a flow diagram that depicts the process for an insert operation of a database object, in an embodiment.

FIG. 4 is a flow diagram that depicts a process for an insert operation of a database object, in an embodiment.

At block 400, a DBMS with parallel modification database server processes receives an insert operation request for the database object.

At block 410, the receiving DBMS may spawn or assign a database server process for performing the insert operation in parallel with other operations being performed by other parallel database server processes. For example, a query coordinator process may spawn a new slave process to execute the insert operation request in parallel with other slave processes performing other operations.

At block 450, the database server process executes the insert operation and at block 460 commits the insert operation. When an insert operation completes and commits, the end result is a new database object (e.g., row) with a new version.

At block 470, the database server process determines whether any dependency lock exists for the new database object. In an embodiment, the database server process signals to other database server processes that a new database object has been created, at block 470. Upon a receipt of such a message from the database server process performing the insert, the database server processes query their respective dependency locking data structures to determine if a dependency lock exists for the new database object. If any entry is identified in the dependency lock data structure(s), at block 480, the corresponding dependency lock(s) are released for the respective database server process(s) that are waiting for the new database object. The respective database server process(s) associated with the identified entry(ies) are re-activated to continue with the committal of the operation requiring the new database object.

In another embodiment, the inserting database server process itself queries one or more dependency lock data structures to determine whether any dependency lock data structure contains the database object identifier of the new database object identifier. At block 470, if any dependency locks are identified, the database server process causes the release of the dependency lock(s) at block 480. The release may be performed by updating the status in the dependency lock data structure or erasing the dependency lock data structure, thus signaling the waiting database server process to proceed with the operation(s) requiring the new database object.

If no dependency lock has been identified at block 470, the insert operation is successfully completed.

Database Management System Overview

A database management system (DBMS) manages a database. A DBMS may comprise one or more database servers. A database comprises database data and a database dictionary that are stored on a persistent memory mechanism, such as a set of hard disks. Database data may be organized into database objects and stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology to refer to database objects.

In embodiments, the databases may be structured as key-value stores (e.g., NoSQL or JSON) where different database objects may represent different data structures. Key-values and associated objects can be referenced, for example, utilizing look-up tables such as hash tables.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database schema including database containers, such as tables, views, or complex data types. SQL/XML is a common extension of SQL used when manipulating XML data in an object-relational database. Although the embodiments of the invention are described herein using the term "SQL," the invention is not limited to just this particular database query language and may be used in conjunction with other database query languages and constructs.

A client may issue a series of requests, such as requests for execution of queries, to a database server by establishing a database session, referred to herein as "session." A session comprises a particular connection established for a client to a database server, such as a database instance, through which the client may issue the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. The DBMS directs requests for a service to a database server that has been assigned to running that service. The one or more computing nodes hosting the database server are referred to as running or hosting the service. A service is assigned, at run-time, to a node in order to have the node host the service. A service may also be associated with service-level agreements, which are used to assign a number of nodes to services and allocate resources within nodes for those services. A DBMS may migrate or move a service from one database server to another database server that may run on a different one or more computing nodes. The DBMS may do so by assigning the service to be run on the other database server. The DBMS may also redirect requests for the service to the other database server after the assignment. In an embodiment, after successfully migrating the service to the other database server, the DBMS may halt the service running in the original database server.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "database instance" or "instance." A database server may comprise multiple database instances, some or all of which are running on separate computers, including separate server blades.

Software Overview

Figure 5:
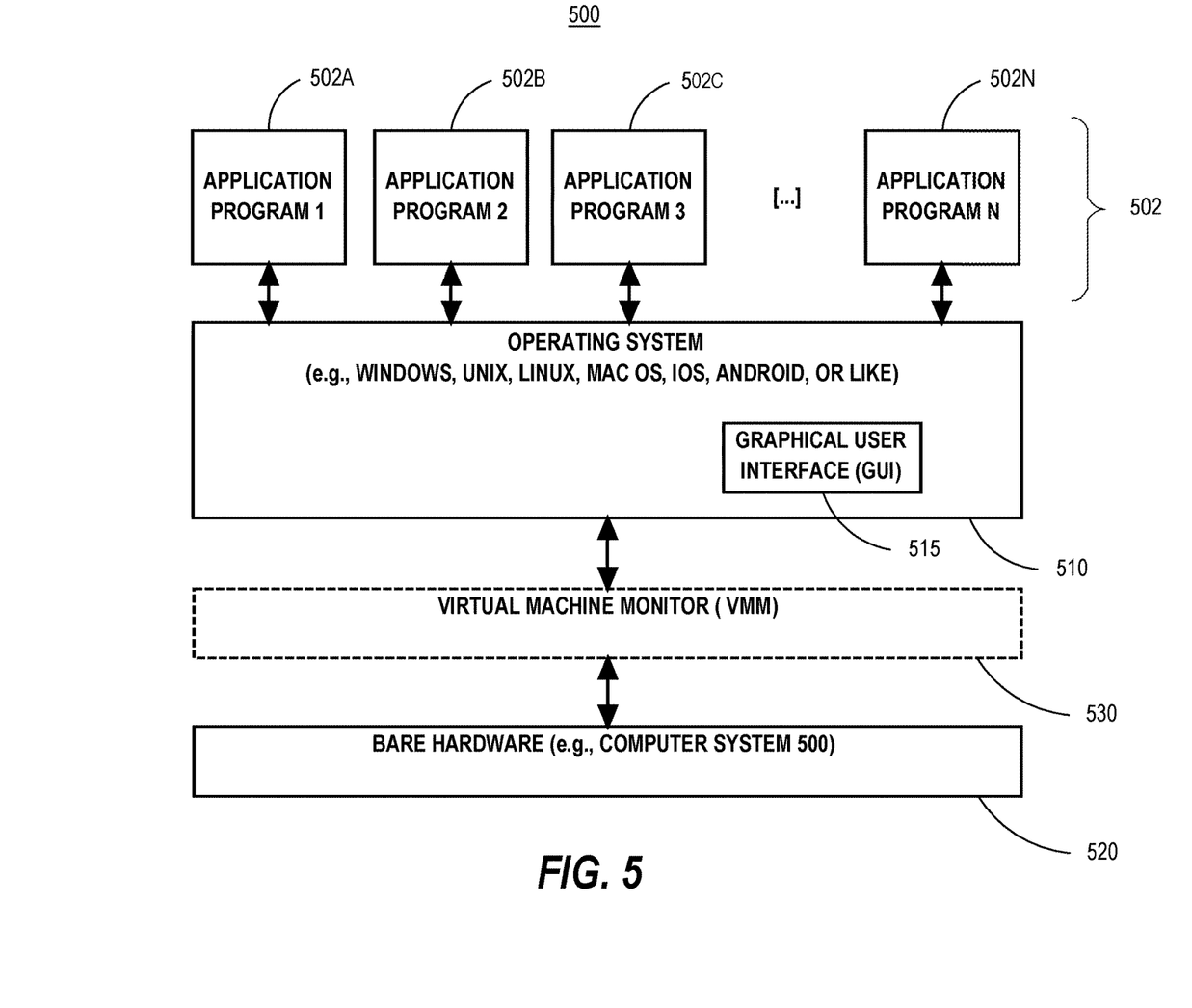
FIG. 5 is a block diagram of a basic software system, in one or more embodiments.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or another communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or another dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626, in turn, provides data communication services through the world wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620, and communication interface 618. In the Internet example, a server 630 might transmit a requested code for an application program through Internet 628, ISP 626, local network 622 and communication interface 618.

The received code may be executed by processor 604 as it is received, and/or stored in storage device 610 or other non-volatile storage for later execution.

Computing Nodes and Clusters

A computing node is a combination of one or more hardware processors that each share access to a byte addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    receiving a request to execute a first operation on a first database, the request comprising an object identifier and a version identifier for a particular version of a particular database object, which is required for successful execution of the first operation on the first database;
    wherein the particular version of the particular database object is generated when a second operation is executed on the first database;
    a first database server process initiating execution of the first operation on the first database, the first database server process executing on one or more computer systems, the execution of the first operation comprising:
    determining that the particular version of the particular database object, while existing on a second database, fails to exist on the first database, and
    based on determining that the particular version of the particular database object fails to exist on the first database, generating a dependency lock indicating the particular version of the particular database object and suspending the first database server process from the execution of the first operation on the first database;
    a second database server process executing the second operation on the first database, after the first database server process initiating the execution of the first operation, thereby causing generating the particular version of the particular database object on the first database and releasing the dependency lock for the particular version of the particular database object, the second database server process executing on the one or more computer systems;
    in response to the second database server process executing the second operation causing the generating of the particular version of the particular database object on the first database and the releasing of the dependency lock for the particular version of the particular database object, the first database server process completing the execution of the first operation on the first database.

2. The method of claim 1, wherein the second operation on the first database comprises applying a change record generated at the second database, wherein the change record is generated in response to a copy of the particular version of the particular database object being generated on the second database.

3. The method of claim 1, wherein in the first database is hosted by a first database management system and the second database is hosted by a second database management system, the first database management system being a replica database management system of the second database management system in a highly-available database management system.

4. The method of claim 1, wherein in the first database is hosted by a first database management system and the second database is hosted by a second database management system and wherein the first operation is part of a concurrent workload executed by both the first database management system and the second database management system.

5. The method of claim 1, wherein the first database is hosted by a first database management system and the second database is hosted by a second database management system, wherein the first database management system being a replica database management system of the second database management system in a highly-available database management system, and wherein the first database management system is recovering by applying changes from the second database management system, the recovering further comprising:
    the second database management system generating a plurality of change records that record changes to a plurality of objects of the second database, each change record of the plurality of change records recording a change to a respective object of the plurality of objects of said second database;
    the first database management system replicating said changes within the first database by applying said plurality of change records of said first database, the replicating comprising applying a change record from the plurality of change records thereby causing the execution of the second operation on the first database; and
    wherein the first operation is part of a concurrent workload executed by both the first database management system and the second database management system.

6. The method of claim 1, wherein the request is a first request, the particular database object is a first database object, the particular version is a first version, the object identifier is a first object identifier and the version identifier is a first version identifier, and the method further comprising:
    receiving a second request to execute a third operation on the first database, the second request comprising a second object identifier and a second version identifier for a second version of a second database object, which is required for successful execution of the first operation on the first database;
    a third database server process initiating execution of the third operation on the first database in parallel with the execution of the second operation, the execution of the third operation comprising:
    querying the first database for the second version of the second database object, based on querying the first database for the second version of the second database object, determining that the second version of the second database object exists on the first database, and based on determining that the second version of the second database object exists on the first database, completing the execution of the third operation on the first database in parallel with the execution of the second operation on the first database.

7. The method of claim 1, wherein the request further comprises a next version identifier for a next version of the particular database object, which is generated by the successful execution of the first operation on the first database, the method further comprising:

in response to the first database server process completing the execution of the first operation on the first database, signaling a plurality of database server processes that the next version of the particular database object exists on the first database thereby causing release of at least one dependency lock on the next version of the particular database object by another database server process.

8. The method of claim 1, wherein the second operation comprises inserting the particular database object into the first database, and the first operation comprises deleting the particular database object from the first database.

9. The method of claim 1, wherein the second operation comprises inserting the particular database object into the first database, and the first operation comprises updating the particular version of the particular database object on the first database.

10. The method of claim 1, wherein the second operation comprises updating the particular database object into the particular version on the first database, and the first operation comprises updating the particular version of the particular database object to a next version on the first database.

11. One or more non-transitory storage media storing a set of instructions, which when executed by one or more hardware processors, cause:

receiving a request to execute a first operation on a first database, the request comprising an object identifier and a version identifier for a particular version of a particular database object, which is required for successful execution of the first operation on the first database;

wherein the particular version of the particular database object is generated when a second operation is executed on the first database;

a first database server process initiating execution of the first operation on the first database, the execution of the first operation comprising:

determining that the particular version of the particular database object, while existing on a second database, fails to exist on the first database, and based on determining that the particular version of the particular database object fails to exist on the first database, generating a dependency lock indicating the particular version of the particular database object and suspending the first database server process from the execution of the first operation on the first database;

a second database server process executing the second operation on the first database, ater the first database server process initiating the execution of the first operation, thereby causing generating the particular version of the particular database object on the first database and releasing the dependency lock for the particular version of the particular database object;

in response to the second database server process executing the second operation causing the generating of the particular version of the particular database object on the first database and the releasing of the dependency lock for the particular version of the particular database object, the first database server process completing the execution of the first operation on the first database.

12. The one or more non-transitory storage media of claim 11, wherein the second operation on the first database comprises applying a change record generated at the second database, wherein the change record is generated in response to a copy of the particular version of the particular database object being generated on the second database.

13. The one or more non-transitory storage media of claim 11, wherein in the first database is hosted by a first database management system and the second database is hosted by a second database management system, the first database management system being a replica database management system of the second database management system in a highly-available database management system.

14. The one or more non-transitory storage media of claim 11, wherein in the first database is hosted by a first database management system and the second database is hosted by a second database management system and wherein the first operation is part of a concurrent workload executed by both the first database management system and the second database management system.

15. The one or more non-transitory storage media of claim 11, wherein the first database is hosted by a first database management system and the second database is hosted by a second database management system, wherein the first database management system being a replica database management system of the second database management system in a highly-available database management system, and wherein the first database management system is recovering by applying changes from the second database management system, the recovering further comprising:

the second database management system generating a plurality of change records that record changes to a plurality of objects of the second database, each change record of the plurality of change records recording a change to a respective object of the plurality of objects of said second database;

the first database management system replicating said changes within the first database by applying said plurality of change records of said first database, the replicating comprising applying a change record from the plurality of change records thereby causing the execution of the second operation on the first database; and wherein the first operation is part of a concurrent workload executed by both the first database management system and the second database management system.

16. The one or more non-transitory storage media of claim 11, wherein the request is a first request, the particular database object is a first database object, the particular version is a first version, the object identifier is a first object identifier and the version identifier is a first version identifier, and wherein the set of instruction includes instructions, which, when executed by the one or more hardware processors, cause:

receiving a second request to execute a third operation on the first database, the second request comprising a second object identifier and a second version identifier for a second version of a second database object, which is required for successful execution of the first operation on the first database;

a third database server process initiating execution of the third operation on the first database in parallel with the execution of the second operation, the execution of the third operation comprising:
  querying the first database for the second version of the second database object,
  based on querying the first database for the second version of the second database object, determining that the second version of the second database object exists on the first database, and
  based on determining that the second version of the second database object exists on the first database, completing the execution of the third operation on the first database in parallel with the execution of the second operation on the first database.

17. The one or more non-transitory storage media of claim 11, wherein the request further comprises a next version identifier for a next version of the particular database object, which is generated by the successful execution of the first operation on the first database, and wherein the set of instructions includes instructions, which when executed by the one or more hardware processors, further cause:
  in response to the first database server process completing the execution of the first operation on the first database, signaling a plurality of database server processes that the next version of the particular database object exists on the first database thereby causing release of at least one dependency lock on the next version of the particular database object by another database server process.

18. The one or more non-transitory storage media of claim 11, wherein the second operation comprises inserting the particular database object into the first database, and the first operation comprises deleting the particular database object from the first database.

19. The one or more non-transitory storage media of claim 11, wherein the second operation comprises inserting the particular database object into the first database, and the first operation comprises updating the particular version of the particular database object on the first database.

20. The one or more non-transitory storage media of claim 11, wherein the second operation comprises updating the particular database object to the particular version on the first database, and the first operation comprises updating the particular version of the particular database object to a next version on the first database.

* * * * *

UNITED STATES PATENT AND TRADEMARK OFFICE
CERTIFICATE OF CORRECTION

PATENT NO. : 11,176,115 B2
APPLICATION NO. : 16/428892
DATED : November 16, 2021
INVENTOR(S) : Hoang et al.

Page 1 of 1

It is certified that error appears in the above-identified patent and that said Letters Patent is hereby corrected as shown below:

In the Claims

In Column 21, Line 33, in Claim 10, delete "into" and insert -- to --, therefor.

In Column 21, Line 62, in Claim 11, delete "ater" and insert -- after --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*